US012583761B2

(12) United States Patent
Zhao

(10) Patent No.: US 12,583,761 B2
(45) Date of Patent: Mar. 24, 2026

(54) PURIFICATION DEVICE AND LIQUID STORAGE TANK

(71) Applicant: Beijing Xiaomi Mobile Software Co., Ltd., Beijing (CN)

(72) Inventor: Ruihua Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 566 days.

(21) Appl. No.: 18/068,340

(22) Filed: Dec. 19, 2022

(65) Prior Publication Data

US 2024/0067536 A1     Feb. 29, 2024

(30) Foreign Application Priority Data

Aug. 23, 2022   (CN) .......................... 202222219269.1

(51) Int. Cl.
*C02F 1/00*        (2023.01)
*B65D 23/10*       (2006.01)
(52) U.S. Cl.
CPC ............ *C02F 1/003* (2013.01); *B65D 23/108* (2013.01); *C02F 2201/004* (2013.01); *C02F 2201/005* (2013.01); *C02F 2307/10* (2013.01)
(58) Field of Classification Search
CPC ................ C02F 1/003; C02F 2201/004; C02F 2201/005; C02F 2307/10; C02F 2201/002; B65D 23/108; A47J 31/4403; A47J 31/461
USPC .................................. 210/234–235, 237–238
See application file for complete search history.

(56) References Cited

U.S. PATENT DOCUMENTS

| | | | |
|---|---|---|---|
| 9,566,990 B2 | 2/2017 | Bar-Erez et al. | |
| 2009/0277813 A1* | 11/2009 | Linder | B65D 21/0234 |
| | | | 206/515 |
| 2012/0132573 A1 | 5/2012 | Lautzenheiser et al. | |
| 2016/0107798 A1 | 4/2016 | Carlson et al. | |

FOREIGN PATENT DOCUMENTS

| | | | |
|---|---|---|---|
| CN | 216537294 U | * | 5/2022 |
| EP | 492627 A2 | * | 7/1992 |
| GB | 2401538 A | | 11/2004 |

OTHER PUBLICATIONS

English Translation of CN-216537294-U. (Year: 2022).*
European Patent Office, Extended European Search Report Issued in Application No. 22216894.0, Aug. 23, 2023, Germany, 7 pages.

* cited by examiner

*Primary Examiner* — Terry K Cecil
(74) *Attorney, Agent, or Firm* — McCoy Russell LLP

(57) ABSTRACT

A purification device includes a housing and a liquid storage tank. The liquid storage tank is detachably placed in a placement cavity in the housing. A rotary member is located on the liquid storage tank, and the rotary member is rotatably connected to a top end of a side wall of the liquid storage tank. A first snap-fit portion is located on the rotary member, a second snap-fit portion matching the first snap-fit portion is located at a top end of the placement cavity. In response to determining that the liquid storage tank is located in the placement cavity and the rotary member rotates to a horizontal position, the first snap-fit portion and the second snap-fit portion match each other to clamp the liquid storage tank in the placement cavity.

19 Claims, 10 Drawing Sheets

C

PURIFICATION DEVICE AND LIQUID STORAGE TANK

CROSS REFERENCE TO RELATED APPLICATION

The present application claims priority to the Chinese Patent Application No. 202222219269.1, filed on Aug. 23, 2022. The entire contents of the above-listed application are hereby incorporated by reference for all purposes.

BACKGROUND

Water purifiers, as water dispensers commonly used in life, have been a common sight in life, work and other scenes. The water purifier generally includes a water tank for containing water and a housing forming an external structure of the water purifier, the water tank being mounted in the housing, and water is guided from the water tank to a water outlet nozzle of the housing by a filtration system in the housing. Moreover, the water tank can be detached directly for separate use, which broadens the use scenes for users.

SUMMARY

The disclosure relates to the field of design of split-type water purifiers, and particularly relates to a purification device and a liquid storage tank.

According to a first aspect of the disclosure, a purification device is provided. The purification device is used for purifying a liquid and includes a housing and a liquid storage tank. A placement cavity is formed in the housing, the liquid storage tank is detachably placed in the placement cavity. A rotary member is arranged on the liquid storage tank, and the rotary member is rotatably connected to a top end of a side wall of the liquid storage tank. A first snap-fit portion is arranged on the rotary member, and a second snap-fit portion matching the first snap-fit portion is arranged at a top end of the placement cavity. In response to determining that the liquid storage tank is located in the placement cavity and the rotary member rotates to a horizontal position, the first snap-fit portion and the second snap-fit portion match each other to clamp the liquid storage tank in the placement cavity.

According to a second aspect of the disclosure, a liquid storage tank is provided. The liquid storage tank includes a tank body and a rotary member. The tank body includes a liquid accommodation space. The rotary member is rotatably connected to the tank body, the rotary member may rotatably switch between a first state and a second state, and a first snap-fit portion and a first limiting portion are arranged on the rotary member. In the first state, the rotary member is parallel to the housing, and in the second state, the rotary member is perpendicular to the housing.

BRIEF DESCRIPTION OF THE DRAWINGS

The accompanying drawings here are incorporated into the description as a constituent part of the description, illustrate examples conforming to the disclosure, and serve to explain principles of the disclosure along with the description.

DETAILED DESCRIPTION

Figure 1:
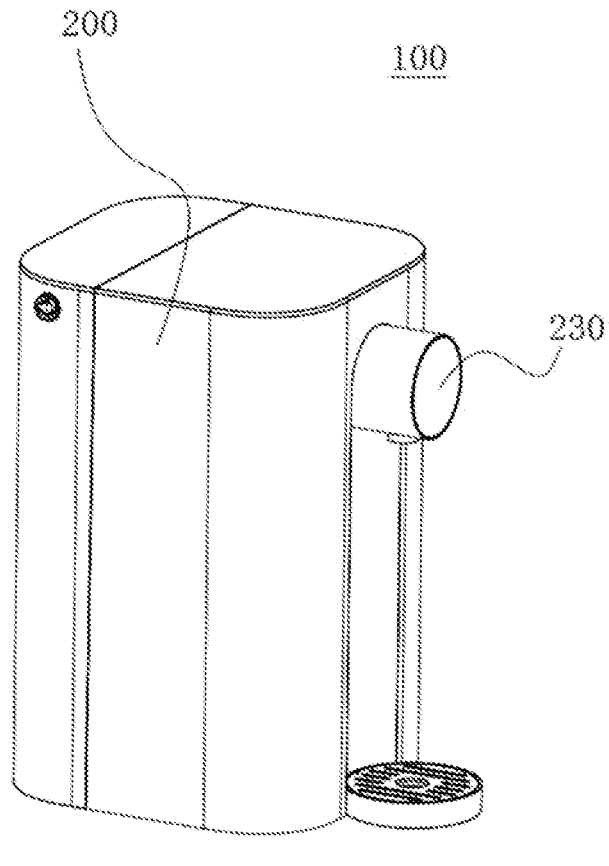
FIG. 1 is a schematic structural diagram of a purification device shown according to an example.
Figure 2:
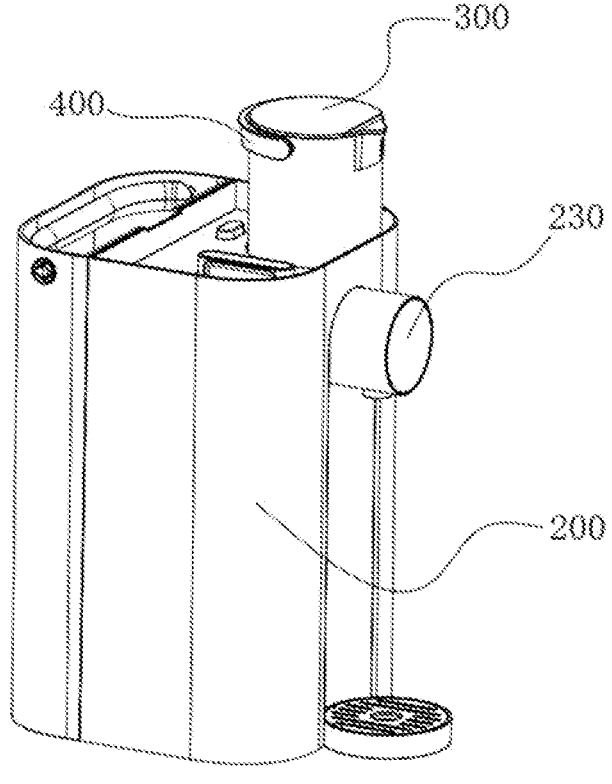
FIG. 2 is a first exploded schematic structural diagram of a purification device shown according to an example.
Figure 3:
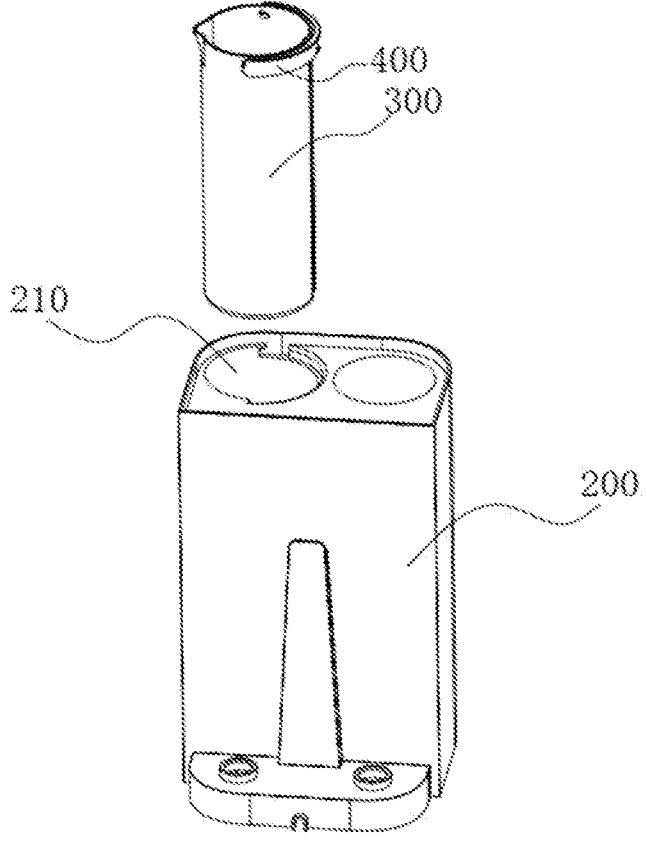
FIG. 3 is a second exploded schematic structural diagram of a purification device shown according to an example.
Figure 4:
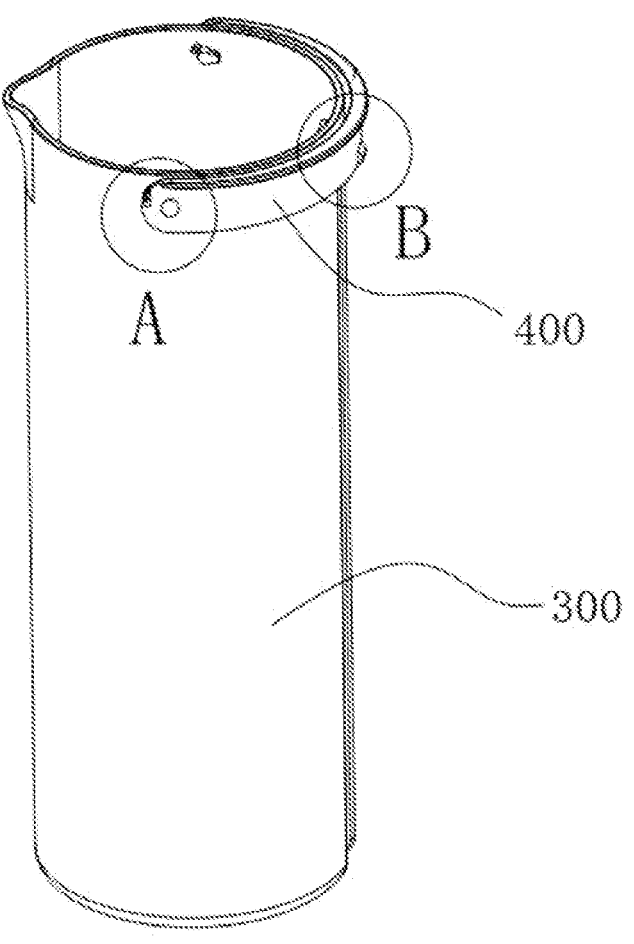
FIG. 4 is a schematic structural diagram of a liquid storage tank shown according to an example.
Figure 5:
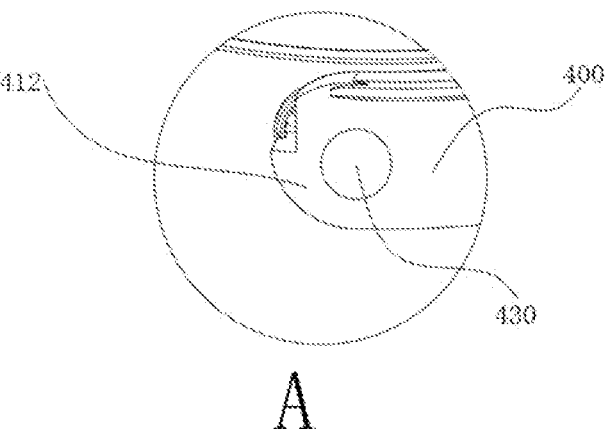
FIG. 5 is a schematic structural diagram (an enlarged view of position A in FIG. 4) of a first protrusion shown according to an example.
Figure 6:
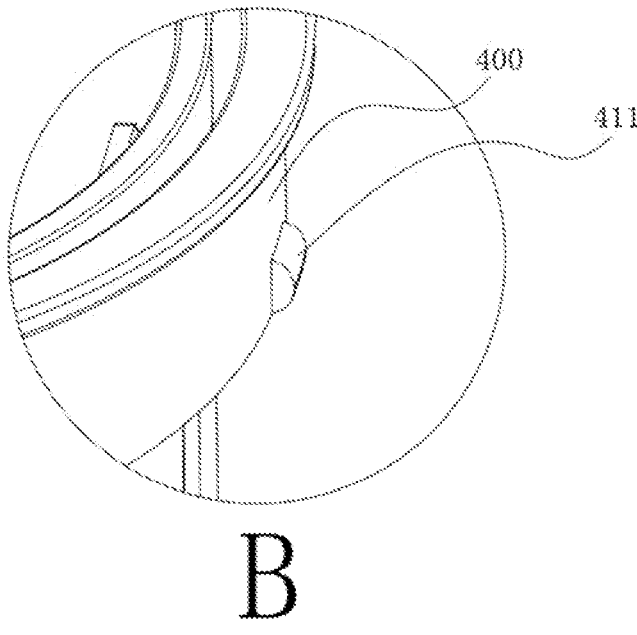
FIG. 6 is a schematic structural diagram (an enlarged view of position B in FIG. 4) of a second protrusion shown according to an example.

The examples will be described in detail here and shown in the accompanying drawings illustratively. When the following descriptions relate to the accompanying drawings, unless otherwise specified, the same numeral in different accompanying drawings denotes the same or similar element. The implementations described in the following examples do not denote all implementations consistent with the disclosure. On the contrary, the implementations are examples of devices and methods consistent with some aspects of the disclosure as detailed in the claims merely.

With the popularization of water purifiers, the functions of the water purifiers are increasingly comprehensive. The existing water purifiers include cabinet type water purifiers, vertical type water purifiers, table-top water purifiers, etc. The table-top water purifiers are selected by increasing users due to the characteristics of small and exquisite appearance and convenient movement.

The table-top water purifier generally includes a water tank, a pure water tank and a filtration device connected between the two liquid storage tanks. The water tank is used for storing raw water (unfiltered water), and raw water in the water tank is filtered to become pure water (purified water) by the filtration device. For ease of use by a user, the water tank may be detached from a housing for separate use, which enriches the use scenes of the user, but brings other problems at the same time. Due to the detachable design of the water tank, a communication position of the water tank and a bottom of the housing of the water purifier is not easy to place in place after many times of detachment, such that the communication position leak water.

In the related art, it's common practice to directly place the water tank in a placement cavity without reinforcement by an external force, but this method has serious limitation. When full of water, the water tank has high stability because of its own great gravity. However, when there is little water stored in the water tank, the water tank will become light and unstable, and water will leak from joints of the water tank and the bottom of the housing.

In view of the above situation, in the related art, a connection mode is designed as follows: an upper cover is arranged at an opening position of the placement cavity of the housing, and is closed after the water tank is put in place in the housing, the upper cover and the housing are connected to each other by a torsion spring, buckles are used on opposite sides for fastening, and the water tank is sealed and pressed in the placement cavity by the upper cover. However, in practical application of such a connection mode, the buckles are extremely likely to get broken and damaged due to concentrated stress, and the entire upper cover is required to be replaced after damage, rendering high maintenance cost and inconvenient maintenance.

In order to overcome the problems in the related art, the disclosure provides a purification device and a liquid storage tank, which are used for solving the problem of how to reliably fix a water tank in a water purifier by means of a simplest structure in a process of mounting the water tank in the water purifier in an example of a purification device that a water purifier includes a detachable water tank in the related art.

The purification device may be the above water purifier, and the liquid storage tank may be the above water tank.

For ease of description, the following examples are explained by taking the above table-top water purifier (collectively referred to as a purification device below for ease of description) as examples, and a water tank (collectively referred to as a liquid storage tank below) is detachably mounted in a housing of a purification device.

An example of the disclosure provides a purification device 100. The purification device is used for purifying a liquid, and as shown in FIGS. 1-12, the purification device 100 includes a housing 200 and a liquid storage tank 300.

A placement cavity 210 is formed in the housing 200.

The liquid storage tank 300 is detachably arranged in the placement cavity 210.

A rotary member 400 is arranged on the liquid storage tank 300, and the rotary member 400 is rotatably connected to a top end of a side wall of the liquid storage tank 300.

A first snap-fit portion 411 is arranged on the rotary member 400, and a second snap-fit portion 211 matching the first snap-fit portion 411 is arranged at a top end of the placement cavity 210.

When the liquid storage tank 300 is located in the placement cavity 210 and the rotary member 400 rotates to a horizontal position, the first snap-fit portion 411 and the second snap-fit portion 211 match each other, such that the liquid storage tank 300 is pressed in the placement cavity 210.

It should be noted that a specific process of fixing and pressing the liquid storage tank 300 in the placement cavity 210 by means of the rotary member 400 is as follows: the rotary member 400 may rotate around the liquid storage tank 300, such that the first snap-fit portion 411 is driven by the rotary member 400 to rotate to a position of the second snap-fit portion 211, and the first snap-fit portion 411 and the second snap-fit portion 211 are in contact with and match each other. Through mutual limitation of the first snap-fit portion 411 and the second snap-fit portion 211, the liquid storage tank 300 may be better pressed.

The technical solutions provided in the examples of the disclosure may have the beneficial effects as follows:

1) a pressing mechanism is simple in structure, and may stably fix and lock the liquid storage tank; and 2) The rotary member provides downward pressure for the liquid storage tank by means of simple lever and plane support effects, such that the bottom of the liquid storage tank is pressed in the placement cavity.

In some examples of the disclosure, as shown in FIGS. 1-12, the rotary member 400 is formed in a U shape or a cambered shape, and two ends of the rotary member 400 are rotatably connected to the liquid storage tank 300 by means of rotary shafts 430 respectively.

The rotary member 400 includes an inner side wall and an outer side wall.

The inner wall side is a surface facing the liquid storage tank 300, and the outer side wall is a surface facing away from the inner side wall.

On the basis of the above example, in some examples of the disclosure, the first snap-fit portion 411 includes a second protrusion.

The second protrusion is arranged on the outer side wall of the rotary member 400, and protrudes out of a surface of the outer side wall. The second snap-fit portion 211 includes a second snap groove.

The second snap groove is provided near a top end of a side wall of the placement cavity 210.

An arrangement position of the second snap groove corresponds to an arrangement position of the second protrusion.

A shape and a size of the second snap groove match a shape and a size of the second protrusion, such that when the liquid storage tank 300 is located in the placement cavity 210 and the rotary member 400 rotates to the horizontal position, the second protrusion may be embedded in the second snap groove in a snap-fit manner.

It should be noted that the second protrusion is embedded in the second snap groove, and the second protrusion and the second snap groove are tightly fixed to and in snap fit with each other, such that the liquid storage tank 300 is fixed in the housing 200.

In some examples of the disclosure, as shown in FIGS. 1-12, a first limiting portion 412 is further arranged on the rotary member 400, and a second limiting portion 212 matching the first limiting portion 412 is arranged at the top end of the placement cavity 210.

When the liquid storage tank 300 is located in the placement cavity 210, the first limiting portion 412 and the second limiting portion 212 match each other to limit a rotation angle of the rotary member 400.

On the basis of the above concept, in a specific example of the disclosure, the first limiting portion 412 includes two first protrusions, and the two first protrusions are arranged at the two ends of the rotary member 400 respectively and protrude out of end surfaces of the rotary member 400.

The second limiting portion 212 includes two first snap grooves provided at positions, close to the top end, of the side wall of the placement cavity 210, opening directions of the two first snap grooves face a circumferential direction of the placement cavity 210.

Arrangement positions of the two first snap grooves correspond to positions of the two first protrusions respectively.

When the liquid storage tank 300 is located in the placement cavity 210 and the rotary member 400 rotates to the horizontal position, tops of the two first protrusions are in contact with top walls of the two first snap grooves respectively.

It should be noted that on the basis of the above example, in addition to matching each other to limit the rotation angle of the rotary member 400, the first limiting portion 412 and the second limiting portion 212 may use the rotary member 400 to take the rotary shafts 430 as fulcrums, and take the rotary member 400 as a lever. A top of the first protrusion is pressed against the first snap groove, the first snap groove provides pressure for the top of the first protrusion, and further, the pressure acts on the rotary member 400, specifically on the rotary shafts 430. The pressure is finally transmitted to the liquid storage tank 300, such that the whole liquid storage tank 300 is subjected to a downward force, and the liquid storage tank 300 is pressed at the bottom of the placement cavity 210.

A communication position of the liquid storage tank 300 and the housing 200 are in contact with and attached to each other, such that the liquid storage tank and the housing are more tightly connected to each other. This design solution may prevent the communication position of the bottom of the liquid storage tank 300 and the bottom of the placement cavity 210 from leaking water.

Figure 7:
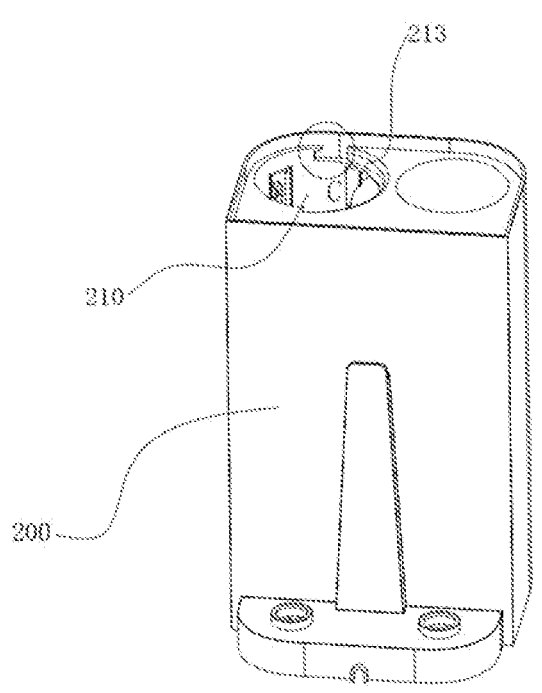
FIG. 7 is a schematic structural diagram of a housing shown according to an example.
Figure 8:
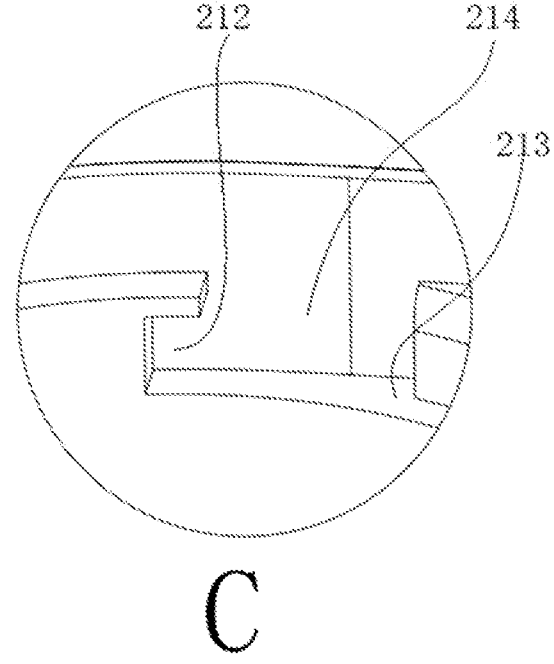
FIG. 8 is a schematic structural diagram (an enlarged view of position C in FIG. 7) of a first matching groove shown according to an example.

On the basis of the above description, in some examples of the disclosure, as shown in FIGS. 7 and 8, a stepped recess 213 extending in the circumferential direction of the placement cavity 210 is provided at the top end of the side wall of the placement cavity 210, and the stepped recess 213 is used for accommodating the rotary member 400.

Two notches 214 with upward openings are provided at the stepped recess 213, and arrangement positions of the two notches 214 correspond to the positions of the two first protrusions respectively.

The two first snap grooves are provided on sides of the two notches 214 away from the stepped recess 213 respectively.

On the basis of the above example, a process of pressing the liquid storage tank 300 in the placement cavity 210 by means of the rotary member 400 is as follows:

the first protrusions extend into the first snap grooves, such that the tops of the first protrusions are opposite top walls of the first snap grooves;

the rotary member 400 is rotated, the tops of the first protrusions at an end of the rotary member 400 are in contact with the top walls of the first snap grooves; and when the rotary member 400 is further rotated, the tops of the first protrusions are pressed against the top walls of the first snap grooves, the top walls of the first snap grooves provide downward pressure for the tops of the first protrusions, and the downward pressure is transmitted to the liquid storage tank 300, such that the liquid storage tank 300 is pressed against the bottom of the placement cavity 210.

The rotary member 400 is continuously rotated, such that the second protrusion is locked and positioned in the second snap groove, and the liquid storage tank 300 is fixed in the placement cavity 210.

On the basis of the above process, it should be noted that the first snap grooves provide downward pressure for the liquid storage tank 300 by means of the first protrusions, second protrusion rotates into the second snap groove, the rotary member 400 is locked and fixed through a limiting effect of the second protrusion and the second snap groove, and the rotary member 400 is locked through interference fit between the second protrusion and the second snap groove, such that the liquid storage tank 300 is fixed in the placement cavity 210, and the liquid storage tank 300 is fixedly and stably mounted.

Figure 13:
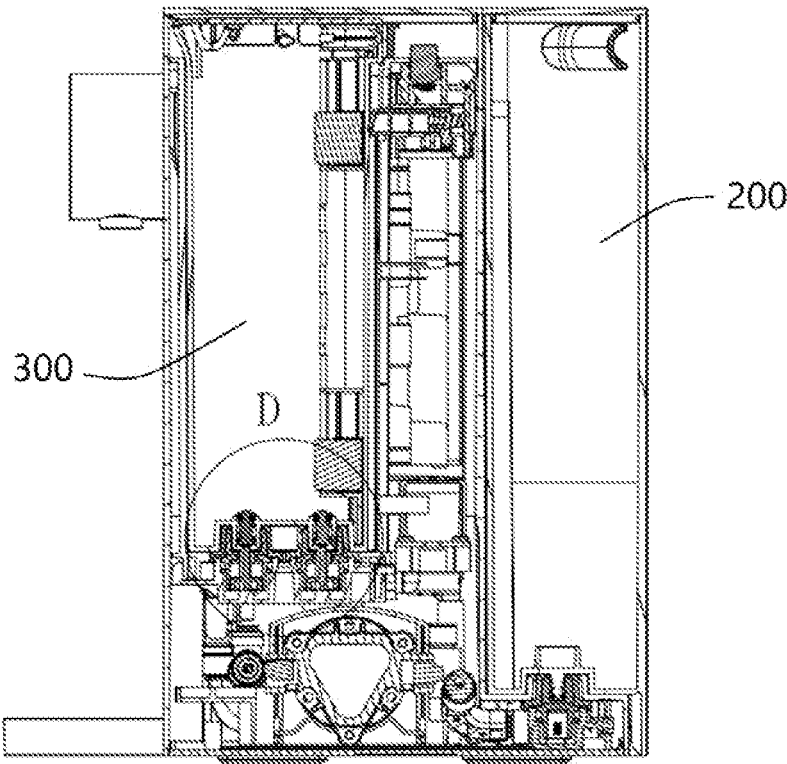
FIG. 13 is a schematic diagram of a half-sectional structure of an interior of a purification device shown according to an example.
Figure 14:
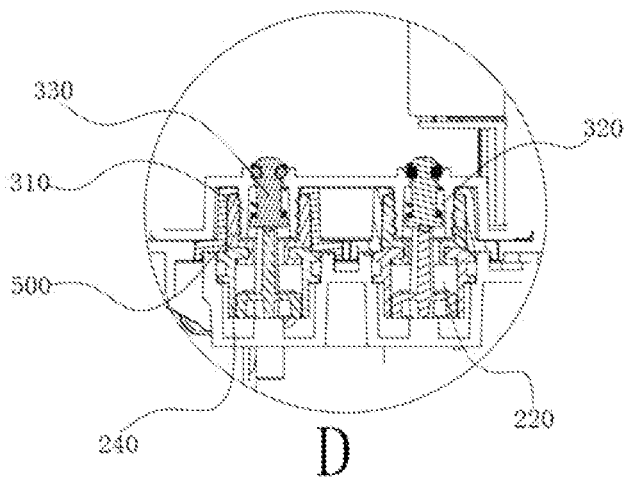
FIG. 14 is a schematic diagram of an arrangement position of a sealing member shown according to an example.
Figure 15:
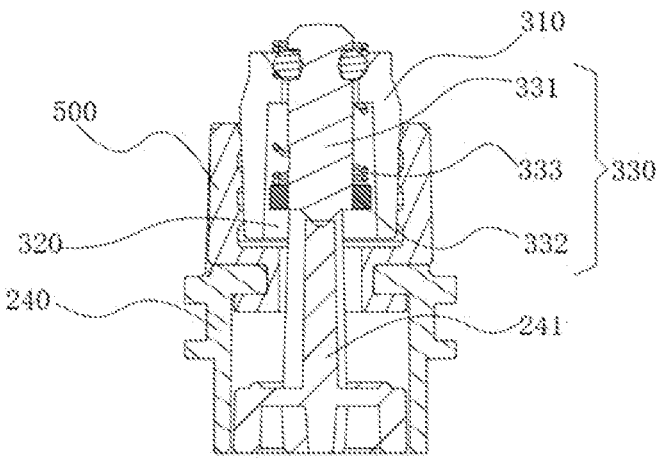
FIG. 15 is a schematic diagram of a connection structure of a water guide portion, a sealing member and a water guide matching portion shown according to an example.

In some examples of the disclosure, as shown in FIGS. 13-15, a specific connection relation between the liquid storage tank 300 and the housing 200 is as follows:

a first communication port 220 in communication with a liquid supply passage is provided at the bottom of the placement cavity 210;

a second communication port 320 in communication with an interior of the liquid storage tank 300 is provided at the bottom of the liquid storage tank 300; and an arrangement position of the second communication port 320 corresponds to an arrangement position of the first communication port 220, and a shape and a size of the second communication port and a shape and a size of the first communication port match each other, such that the second communication port and the first communication port are in communication with each other when the liquid storage tank 300 is placed in the placement cavity 210.

It should be noted that the liquid storage tank 300 and the housing 200 are in communication with each other by means of the first communication port 220 at the bottom of the placement cavity 210 and the second communication port at the bottom of the liquid storage tank 300.

In some examples of the disclosure, as shown in FIGS. 13-16, a sealing member 500 is arranged between the liquid storage tank 300 and the placement cavity 210.

The sealing member 500 is arranged at a communication position of the first communication port 220 and the second communication port 320, and two ends of the sealing member 500 are in communication with the first communication port 220 and the second communication port 320 respectively.

When the liquid storage tank 300 is located in the placement cavity 210 and the rotary member 400 rotates to the horizontal position, the bottom of the liquid storage tank 300 presses the sealing member 500 to make the sealing member 500 elastically deformed.

It should be noted that the sealing member 500 has certain elasticity, and may be made of rubber material, such that the sealing member 500 made of elastic material may enhance a sealing effect through elasticity of the sealing member.

The function of the sealing member 500 is to seal a communication position of the first communication port 220 and the second communication port 320, so as to prevent the communication position from leaking water. The sealing member 500 may be elastically deformed under the pressure of the liquid storage tank 300, such that the sealing member 500 and the liquid storage tank 300 may be more tightly attached to each other.

It should also be noted that in the prior art, there is also a solution of arranging an elastic sealing member 500 at the communication position of the liquid storage tank 300 and the housing 200, but in fact, the sealing member 500 does not realize a sealing effect, but is a factor causing the communication position of the liquid storage tank 300 and the placement cavity 210 to leak water. The reason is that those skilled find that when the liquid storage tank 300 in the prior art is placed, since the sealing member 500 occupies part of a space in the placement cavity 210, the liquid storage tank 300 is susceptible to interference from the sealing member 500 in a mounting process and is less likely to be placed in place. Thus, the first communication port 220 and the second communication port 320 may not be in corresponding communication with each other, causing water leakage.

However, in the technical solution of the disclosure, the rotary member 400 may provide an external mechanical force for the liquid storage tank 300, such that the liquid storage tank 300 is locked in the placement cavity 210. Moreover, the sealing member 500 is pressed by the external mechanical force, such that the liquid storage tank 300 is easier to mount in place. Thus, the sealing member 500 in the disclosure and the rotary member 400 may complement each other, and the effect of preventing the communication position of the first communication port 220 and the second communication port 320 from leaking water is enhanced.

On the basis of the above example, in order to conveniently mount the sealing member 500, as shown in FIGS. 13-16, a water guide portion 310 is arranged at the bottom of the liquid storage tank 300.

The water guide portion 310 is a columnar boss extending in a normal direction of a bottom plane of the liquid storage tank 300, and the second communication port 320 is formed at a bottom of the water guide portion 310.

A water guide matching portion 240 is arranged at the bottom of the placement cavity 210, the sealing member 500 is fixedly mounted on the water guide matching portion 240, and a first communication port 220 suitable for being communication with the second communication port 320 is formed in the water guide matching portion 240.

It should be noted that the objective of shapes of the joints of the liquid storage tank 300 and the housing 200 is as follows: the liquid storage tank 300 is easier to place in place in the housing 200, the water guide portion 310 formed at the bottom of the liquid storage tank 300 enables a water outlet direction of the liquid storage tank 300 to be centralized, the water guide matching portion 240 at the bottom of the placement cavity 210 is used for collecting water out from the liquid storage tank 300 in a centralized manner, the first communication port 220 and the second communication port 320 are more smoothly in communication with each other, and the situation that water leakage occur since the liquid storage tank 300 is not mounted in place is not likely to occur.

In some examples of the disclosure, as shown in FIGS. 13-16, the sealing member 500 includes a mounting portion 510, an accommodation portion 520, and a sealing member passage.

The mounting portion 510 is fixed to the water guide matching portion 240.

An accommodation space is formed in the accommodation portion 520.

The sealing member passage is formed in the sealing member 500.

Figure 16:
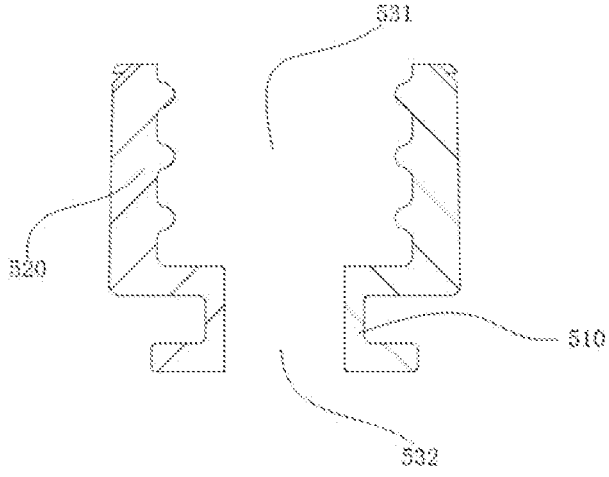
FIG. 16 is a schematic structural diagram of a sealing member shown according to an example.

On the basis of the above example, as shown in FIG. 16, the portion of the sealing member passage located in the sealing member 500 includes: a first hole section 531 and a second hole section 532 sequentially connected to each other in an upper-lower direction, and the first hole section 531 has an aperture larger than an aperture of the second hole section, so as to form a step.

After the liquid storage tank 300 is mounted in place in the placement cavity 210, the water guide portion 310 is accommodated in the accommodation space and is in interference fit with the portion of the sealing member passage located in the accommodation portion 520, the first communication port 220, the second communication port 320 and the sealing member passage are sequentially in communication with each other to form a fluid passage, and the bottom of the water guide portion 310 abuts against and is pressed against a plane of the step formed between the first hole section 531 and the second hole section 532.

It should be noted that the objective of a shape design of the sealing member 500 is as follows: a sealing effect may be better, and a connection relation between the liquid storage tank 300 and the housing 200 may be tighter.

In the situation that the liquid storage tank 300 is not mounted in the accommodation portion 520 of the sealing member 500, the accommodation portion is kept open. When the liquid storage tank 300 is mounted in the housing 200, the water guide portion 310 is aligned with the accommodation portion 520 and inserted into the accommodation portion 520, the water guide portion 310 is in interference fit with the accommodation portion 520, and a bottom of the water guide portion 310 abuts, under the pressure of the rotary member 400, against the plane of the step formed between the first hole section 531 and the second hole section 532, such that a sealing effect of the sealing member 500 is enhanced.

It should be further noted that as shown in FIGS. 13-16, when the liquid storage tank 300 is normally placed, the water guide portion 310 is only in contact with the plane of the step formed between the first hole section 531 and the second hole section, and the plane of the step is pressed by the weight of the liquid storage tank 300. When the rotary member 400 on the top of the liquid storage tank 300 rotates, the first protrusion and the first snap groove are connected to each other to be locked, and the second protrusion and the second snap groove are connected to each other to be locked. In this way, the liquid storage tank 300 is mounted in place, the second protrusion makes the liquid storage tank 300 stably locked and fixed in the placement cavity 210, and the first protrusion provides downward pressure for the liquid storage tank 300 while locking and fixing the liquid storage tank 300, such that the water guide portion 310 at the bottom of the liquid storage tank 300 is pressed against the plane of the step, and a back side of a bottom surface of the accommodation portion 520 is supported by the water guide matching portion 240. The water guide portion 310 and the water guide matching portion 240 clamp the sealing member 500 to enhance a connecting and sealing effect between the liquid storage tank 300 and the housing 200.

In addition, on the basis of the pressing and connecting process of the sealing member 500, the first communication port 220, the sealing member 500 passage and the second communication port 320 are always aligned with and in communication with each other in the connecting and pressing process. Thus, on the basis of tight seal and connection, it is guaranteed that water smoothly flows in the fluid passage.

In some examples of the disclosure, as shown in FIGS. 13-16, a switch valve 330 is arranged at the water guide portion 310.

The switch valve 330 includes a sliding column 331, a blocking sheet 332, and a spring 333.

One end of the sliding column 331 is fixedly mounted in the water guide portion 310, the blocking sheet 332 slidably sleeves the sliding column 331, and the blocking sheet 332 slides on the sliding column 331, so as to control the switch valve 330 to switch between an opened state and a closed state.

One end of the spring 333 is fixedly connected to the other end of the sliding column 331, and the other end of the spring 333 is fixedly connected to the blocking sheet 332.

The blocking sheet 332 is arranged at an opening position of one end of the second communication port 320 in a closing manner, and the switch valve 330 is in the closed state.

It should be noted that when the liquid storage tank 300 is not mounted, the spring 333 supports the blocking sheet 332 to be attached to and pressed against to completely cover the opening end of the second communication port 320, so as to close the second communication port 320.

The switch valve 330 is designed to control opening and closing of a water outlet position of the liquid storage tank 300. The switch valve is configured as follows:

when the liquid storage tank 300 is not mounted in the housing 200, the second communication port 320 of the liquid storage tank 300 is closed, and water of the liquid storage tank 300 does not flow out to the outside.

A push rod 241 is arranged in the water guide matching portion 240, and when the water tank is mounted in place in the housing 200, one end of the push rod 241 is in contact with the blocking sheet 332 to enable the blocking sheet 332 to move from the opening position of the second communication port 320 in an axial direction of the sliding column 331, and the switch valve 330 is in the opened state.

In this way, the first communication port 220 and the second communication port 320 are in communication with each other, and the water in the liquid storage tank 300 sequentially flows to the outside of the housing 200 through the second communication port 320 and the first communication port 220.

In some examples of the disclosure, as shown in FIGS. 1-5, a water outlet nozzle 230 is arranged on the housing 200, and the water outlet nozzle 230 is in communication with the fluid passage.

It should be noted that the first communication port 220 and the second communication port 320 are in communication with each other to form a fluid passage, and the water outlet nozzle 230 is used for guiding out the water in the liquid storage tank 300, and the user receives water by means of the water outlet nozzle 230.

On the basis of the above example, the disclosure relates to a purification device 100. The liquid storage tank 300 is detachably placed in a placement cavity 210 in a housing 200 of the purification device 100, and a bottom of the liquid storage tank 300 and a bottom of the placement cavity 210 are in communication with each other to form a communication passage. A rotary member 400 is arranged on the liquid storage tank 300, the rotary member 400 realizes locking fit between a first snap-fit portion 411 and a second snap-fit portion 211 through rotation, such that the liquid storage tank 300 is fixed in the placement cavity 210, and leakage of a communication position of a first communication port 220 and a second communication port 320 caused by "untight pressing" is avoided. The rotary member 400 provides downward pressure for the liquid storage tank 300 by means of simple lever and plane support effects, such that the bottom of the liquid storage tank 300 is pressed in the placement cavity 210.

On the basis of the design of the above water purifier and the effect concept of sealing the communication position of the liquid storage tank 300 and the housing 200, the disclosure further provides a liquid storage tank 300. The liquid storage tank 300 is applied to the purification device 100. As shown in FIGS. 1-5 and 17, the liquid storage tank 300 includes a tank body 301 and a rotary member 400.

A liquid accommodation space is provided on the tank body 301, and the rotary member 400 is rotatably connected to the tank body 301.

The rotary member 400 may rotatably switch between a first state and a second state, and a first snap-fit portion 411 and a first limiting portion 412 are arranged on the rotary member 400.

Figure 9:
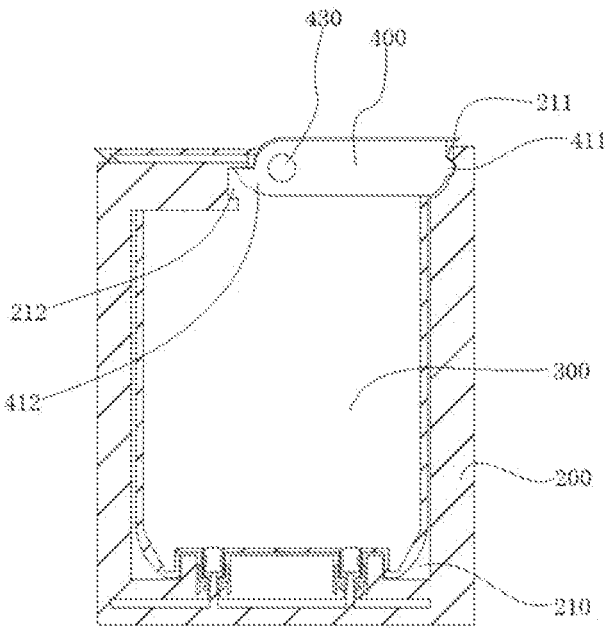
FIG. 9 is a first schematic diagram of a mounting structure of a liquid storage tank in a housing shown according to an example.
Figure 10:
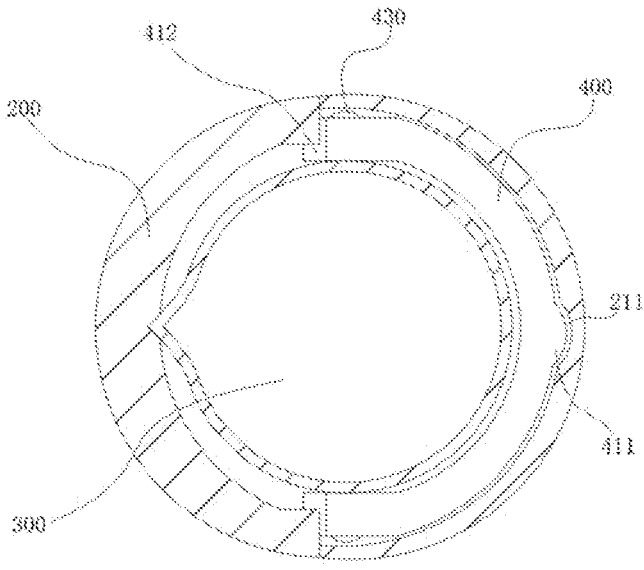
FIG. 10 is a second schematic diagram of a mounting structure of a liquid storage tank in a housing shown according to an example.

As shown in FIGS. 9 and 10, in the first state, the rotary member 400 is parallel to the tank body 301.

Figure 11:
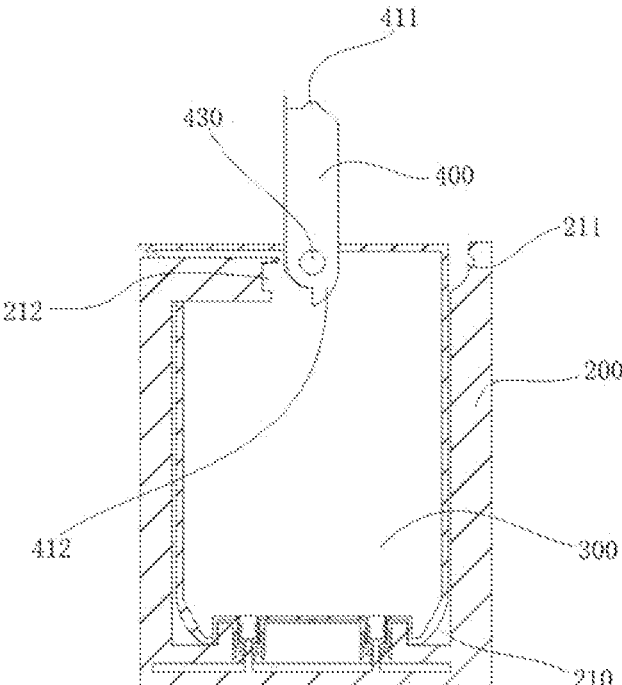
FIG. 11 is a third schematic diagram of a mounting structure of a liquid storage tank in a housing shown according to an example.
Figure 12:
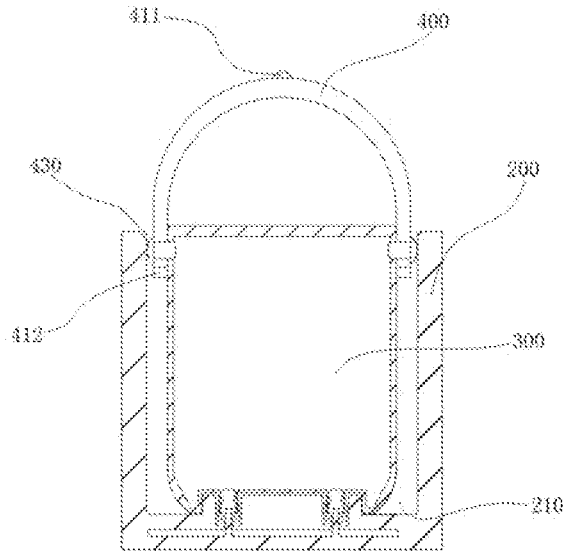
FIG. 12 is a fourth schematic diagram of a mounting structure of a liquid storage tank in a housing shown according to an example.

As shown in FIGS. 11 and 12, in the second state, the rotary member 400 is perpendicular to the tank body 301.

It should be noted that in a specific example of the disclosure, a handle may be used as the rotary member 400. Since the handle is a conventional component of the liquid storage tank 300, and the handle may rotate relative to the liquid storage tank 300, by using the handle as the rotary member 400 in the disclosure, other structures are not required to be additionally arranged on the liquid storage tank 300 on the basis of the original structure. On the one hand, it may save production and design costs, and on the other hand, it may reduce the increase in size of the liquid storage tank 300 due to the addition of the rotary menber 400.

It should also be noted that the handle is used as a pulling member of the liquid storage tank 300, and a user may move the liquid storage tank 300 by holding the handle by hand. Thus, in order to guarantee structural strength of the handle, the handle is required to have a certain width and thickness. For this reason, there is enough space on the handle for placement of the first snap-fit portion 411, and the first snap-fit portion 411 may be directly mounted in the form of fusion connection on the basis of the original handle without carrying out mold-making design on the handle again.

The first state and the second state of the rotary member 400 correspond to different positions of the rotary member 400 rotating around the rotary shafts 430 respectively. When rotation positions of the rotary member 400 are different, relative matching relations between a first matching surface and a second matching surface are also different, that is, in the first state of the rotary member 400, the first matching surface is pressed against and match the second matching surface, the liquid storage tank 300 is placed in place in the placement cavity 210, and the liquid storage tank 300 is pressed at the bottom of the placement cavity 210 under the action of the rotary member 400. In the second state of the rotary member 400, the first matching surface and the second matching surface are not in close proximity to each other, and the liquid storage tank 300 is pressed against the bottom of the placement cavity by means of weight rather than an external force.

The first matching surface may be a bottom surface of the liquid storage tank 300, and the second matching surface may be a bottom surface of the placement cavity 210.

Figure 17:
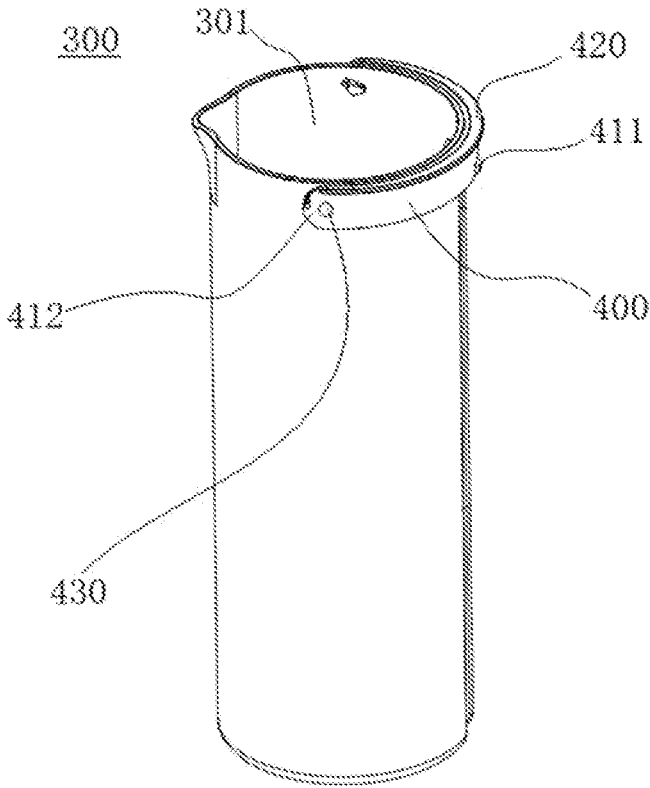
FIG. 17 is a schematic structural diagram of a liquid storage tank shown according to an example.

As shown in FIG. 17, a flange 420 is arranged on the rotary member 400.

It should be noted that a user may hold the flange 420 to rotate the rotary member 400, such that operation by a user is convenient, and a rotating process of the rotary member 400 is more labor-saving.

It should be understood that the above general description and the following detailed description are illustrative and explanatory merely, and cannot limit the disclosure.

It can be understood that the term "plurality" in the disclosure refers to two or above, and other quantifiers are similar. The term "and/or", which is an association relation describing associated objects, means that there can be three relations. For example, an A and/or a B can represent three situations: there is the A alone, there are the A and the B at the same time, and there is the B alone. The character "/" generally indicates that associated objects in the context are in an "or" relation. The singular forms such as "a", "the" and "this" used are also intended to include the plural forms, unless otherwise clearly stated in the context.

It can be further understood that the terms "first", "second", etc. are used for describing various information, but this information should not be limited by these terms. These terms are merely used to distinguish the same type of information from each other, and do not denote any specific order or importance. In fact, the expressions "first", "second", etc. can be used interchangeably. For example, first information could also be referred to as second information, and similarly, second information could also be referred to as first information, without departing from the scope of the disclosure.

It can be further understood that the orientation or positional relations indicated by the terms "center", "longitudinal", "transverse", "front", "rear", "upper", "lower", "left", "right", "vertical", "horizontal", "top", "bottom", "inside", "outside", etc. are based on the orientation or positional relations shown in the accompanying drawings, are merely for facilitating the description of the examples and simplifying the description, rather than indicating or implying that a device or element referred to must have a particular orientation or be constructed and operated in a particular orientation.

It can be further understood that unless otherwise specified, the term "connect" includes a direct connection that no other elements exist between two components, and an indirect connection that other elements exist between two components.

It can be further understood that although operations are described in the accompanying drawings in specific order in examples of the disclosure, it should not be understood that these operations are required to be executed in shown specific order or in serial order, or that all illustrated operations are required to be executed so as to realize expected results. In certain circumstances, multitasking and parallel processing may be advantageous.

A person skilled in the art could easily conceive of other implementation solutions of the disclosure upon consideration of the description and the disclosure in the implementation. The disclosure is intended to cover any variations, uses or adaptive changes of the disclosure, which follow the general principles of the disclosure and include common general knowledge or customary technical means in the art that is not disclosed in the disclosure. The description and the examples are to be regarded as illustrative merely, and the true scope and spirit of the disclosure are indicated by the following claims.

It should be understood that the disclosure is not limited to a precise structure that has been described above and illustrated in the accompanying drawings, and can have various modifications and changes without departing from the scope of the disclosure. The scope of the disclosure is limited by the appended claims merely.

Additional non-limiting embodiments of the disclosure include:

1. A purification device, used for purifying a liquid and including a housing and a liquid storage tank, where a placement cavity is formed in the housing, the liquid storage tank is detachably placed in the placement cavity. A rotary member is located on the liquid storage tank, and the rotary member is rotatably connected to a top end of a side wall of the liquid storage tank. A first snap-fit portion is located on the rotary member, and a second snap-fit portion matching the first snap-fit portion is located at a top end of the placement cavity. In response to determining that the liquid storage tank is located in the placement cavity and the rotary member rotates to a horizontal position, the first snap-fit portion and the second snap-fit portion match each other to clamp the liquid storage tank in the placement cavity.

2. The purification device of embodiment 1, where the rotary member is formed in a U shape or a cambered shape, and two ends of the rotary member are rotatably connected to the liquid storage tank by means of rotary shafts respectively. The rotary member includes an inner side wall and an outer side wall, the inner side wall is a surface facing the liquid storage tank, and the outer side wall is a surface facing away from the inner side wall.

3. The purification device of embodiment 2, where the first snap-fit portion includes a second protrusion, the second protrusion is arranged on the outer side wall of the rotary member, and the second protrusion protrudes out of a surface of the outer side wall. The second snap-fit portion includes a second snap groove, and the second snap groove is provided near a top end of a side wall of the placement cavity. An arrangement position of the second snap groove corresponds to an arrangement position of the second protrusion, and a shape and a size of the second snap groove match a shape and a size of the second protrusion, in response to determining that the liquid storage tank is located in the placement cavity and the rotary member rotates to the horizontal position, the second protrusion may be embedded in the second snap groove in a snap-fit manner.

4. The purification device of embodiments 2 or 3, where the rotary member includes a first limiting portion, and a second limiting portion matching the first limiting portion is located at the top end of the placement cavity. In response to determining that the liquid storage tank is located in the placement cavity, the first limiting portion and the second limiting portion match each other to limit a rotation angle of the rotary member.

5. The purification device of embodiment 4, where the first limiting portion includes two first protrusions, and the two first protrusions are arranged at the two ends of the rotary member respectively and protrude out of end surfaces of the rotary member. The second limiting portion includes two first snap grooves located at positions, close to the top end, of the side wall of the placement cavity, opening directions of the two first snap grooves face a circumferential direction of the placement cavity, and arrangement positions of the two first snap grooves correspond to positions of the two first protrusions respectively. In response to determining that the liquid storage tank is located in the placement cavity and the rotary member rotates to the horizontal position, tops of the two first protrusions are in contact with top walls of the two first snap grooves respectively.

6. The purification device of embodiment 5, where a stepped recess extending in the circumferential direction of the placement cavity is located at the top end of the side wall of the placement cavity, and the stepped recess is used for accommodating the rotary member. Two notches with upward openings are located at the stepped recess, and arrangement positions of the two notches correspond to the positions of the two first protrusions respectively. The two first snap grooves are located on sides of the two notches away from the stepped recess respectively.

7. The purification device of any one of embodiments 1 to 6, where a first communication port in communication with a liquid supply passage is located at a bottom of the placement cavity, and a second communication port in communication with an interior of the liquid storage tank is located at a bottom of the liquid storage tank. An arrangement position of the second communication port corresponds to an arrangement position of the first communication port, and a shape and a size of the second communication port and a shape and a size of the first communication port match each other, in response to determining that the liquid storage tank is placed in the placement cavity, the second communication port and the first communication port are in communication with each other.

8. The purification device of embodiment 7, where a sealing member is located between the liquid storage tank and the placement cavity, the sealing member is located at a communication position of the first communication port and the second communication port, and two ends of the sealing member are in communication with the first communication port and the second communication port respectively. In response to determining that the liquid storage tank is located in the placement cavity and the rotary member rotates to the horizontal position, the bottom of the liquid storage tank presses the sealing member to make the sealing member elastically deformed.

9. A liquid storage tank, including a tank body and a rotary member. A liquid accommodation space is provided in the tank body. The rotary member is rotatably connected to the tank body, the rotary member may rotatably switch between a first state and a second state, and a first snap-fit portion and a first limiting portion are located on the rotary member. In the first state, the rotary member is parallel to the housing, and in the second state, the rotary member is perpendicular to the housing.

10. The liquid storage tank of embodiment 9, where a flange is located on the rotary member.

The invention claimed is:

1. A purification device, used for purifying a liquid and comprising:
   a housing, wherein a placement cavity is formed in the housing; and
   a liquid storage tank detachably placed in the placement cavity, wherein a rotary member is located on the liquid storage tank, the rotary member is rotatably connected to a top end of a side wall of the liquid storage tank, and a first snap-fit portion is located on the rotary member, a second snap-fit portion matching the first snap-fit portion is located at a top end of the placement cavity; and
   in response to determining that the liquid storage tank is located in the placement cavity and the rotary member rotates to a horizontal position, the first snap-fit portion and the second snap-fit portion match each other to clamp the liquid storage tank in the placement cavity;
   wherein a first communication port in communication with a liquid supply passage is located at a bottom of the placement cavity, and a second communication port in communication with an interior of the liquid storage tank is located at a bottom of the liquid storage tank, a sealing member is located between the liquid storage tank and the placement cavity, the sealing member is located at a communication position of the first communication port and the second communication port, and two ends of the sealing member are in communication with the first communication port and the second communication port respectively; and
   wherein a water guide portion is arranged at the bottom of the liquid storage tank, the second communication port is formed at a bottom of the water guide portion, and the water guide portion is used to abut against the sealing member.

2. The purification device according to claim 1, wherein the rotary member is formed in a U shape or a cambered shape, and two ends of the rotary member are rotatably connected to the liquid storage tank by means of rotary shafts respectively; and
   the rotary member comprises an inner side wall and an outer side wall, wherein the inner side wall is a surface facing the liquid storage tank, and the outer side wall is a surface facing away from the inner side wall.

3. The purification device according to claim 2, wherein the first snap-fit portion comprises a second protrusion, the second protrusion is located on the outer side wall of the rotary member, and the second protrusion protrudes out of a surface of the outer side wall;
   the second snap-fit portion comprises a second snap groove, and the second snap groove is near a top end of a side wall of the placement cavity; and
   an arrangement position of the second snap groove corresponds to an arrangement position of the second protrusion, and a shape and a size of the second snap groove match a shape and a size of the second protrusion, in response to determining that the liquid storage tank is located in the placement cavity and the rotary member rotates to the horizontal position, the second protrusion can be embedded in the second snap groove in a snap-fit manner.

4. The purification device according to claim 2, wherein the rotary member comprises a first limiting portion, and a second limiting portion matching the first limiting portion is located at the top end of the placement cavity; and
   in response to determining that the liquid storage tank is located in the placement cavity, the first limiting portion and the second limiting portion match each other to limit a rotation angle of the rotary member.

5. The purification device according to claim 4, wherein the first limiting portion comprises two first protrusions, and the two first protrusions are arranged at the two ends of the rotary member respectively and protrude out of end surfaces of the rotary member;
   the second limiting portion comprises two first snap grooves located at positions, close to the top end, of the side wall of the placement cavity, opening directions of the two first snap grooves face a circumferential direction of the placement cavity, and arrangement positions of the two first snap grooves correspond to positions of the two first protrusions respectively; and
   in response to determining that the liquid storage tank is located in the placement cavity and the rotary member rotates to the horizontal position, tops of the two first protrusions are in contact with top walls of the two first snap grooves respectively.

6. The purification device according to claim 5, wherein a stepped recess extending in the circumferential direction of the placement cavity is located at the top end of the side wall of the placement cavity, and the stepped recess is used for accommodating the rotary member;
   two notches with upward openings are located at the stepped recess, and arrangement positions of the two notches correspond to the positions of the two first protrusions respectively; and
   the two first snap grooves are located on sides of the two notches away from the stepped recess respectively.

7. The purification device according to claim 1, wherein an arrangement position of the second communication port corresponds to an arrangement position of the first communication port, and a shape and a size of the second communication port and a shape and a size of the first communication port match each other, in response to determining that the liquid storage tank is placed in the placement cavity, the second communication port and the first communication port are in communication with each other.

8. The purification device according to claim 7, wherein in response to determining that the liquid storage tank is located in the placement cavity and the rotary member rotates to the horizontal position, the bottom of the liquid storage tank presses the sealing member to make the sealing member elastically deformed.

9. The purification device according to claim 1, wherein a water guide matching portion is arranged at the bottom of the placement cavity, the sealing member is fixedly mounted on the water guide matching portion, and the first communication port is formed in the water guide matching portion.

10. The purification device according to claim 9, wherein the sealing member comprises a mounting portion, an accommodation portion, and a sealing member passage, the mounting portion is fixed to the water guide matching portion, an accommodation space is formed in the accommodation portion, and the sealing member passage is formed in the sealing member, after the liquid storage tank is mounted in place in the placement cavity, the water guide portion is accommodated in the accommodation space and is in interference fit with the accommodation portion, the first communication port, the second communication port and the sealing member passage are sequentially in communication with each other to form a fluid passage.

11. The purification device according to claim 10, wherein the sealing member passage comprises: a first hole section and a second hole section sequentially connected to each other in an upper-lower direction, and the first hole section has an aperture larger than an aperture of the second hole section, so as to form a step, after the liquid storage tank is mounted in place in the placement cavity, the bottom of the water guide portion abuts against and is pressed against a plane of the step formed between the first hole section and the second hole section.

12. The purification device according to claim 9, wherein a switch valve is arranged at the water guide portion, the switch valve comprises a sliding column, a blocking sheet, and a spring, one end of the sliding column is fixedly mounted in the water guide portion, the blocking sheet slidably sleeves the sliding column, and the blocking sheet slides on the sliding column, so as to control the switch valve to switch between an opened state and a closed state, one end of the spring is fixedly connected to the other end of the sliding column, and the other end of the spring is fixedly connected to the blocking sheet, and when the blocking sheet is arranged at an opening position of one end of the second communication port in a closing manner, the switch valve is in the closed state.

13. The purification device according to claim 12, wherein a push rod is arranged in the water guide matching portion, and when the liquid storage tank is mounted in place in the housing, one end of the push rod is in contact with the blocking sheet to enable the blocking sheet to move from the opening position of the second communication port in an axial direction of the sliding column, and the switch valve is in the opened state.

14. A liquid storage tank for being detachably placed in a placement cavity of a housing of a purification device, the liquid storage tank comprising:

a tank body comprising a liquid accommodation space; and a rotary member rotatably connected to the tank body, wherein the rotary member can rotatably switch between a first state and a second state;

a first snap-fit portion and a first limiting portion are located on the rotary member; and in the first state, the rotary member is parallel to the tank body, and in the second state, the rotary member is perpendicular to the tank body;

wherein a first communication port in communication with a liquid supply passage is located at a bottom of the placement cavity, and a second communication port in communication with an interior of the liquid storage tank is located at a bottom of the liquid storage tank, a sealing member is located between the liquid storage tank and the placement cavity, the sealing member is located at a communication position of the first communication port and the second communication port, and two ends of the sealing member are in communication with the first communication port and the second communication port respectively; and wherein a water guide portion is arranged at the bottom of the liquid storage tank, the second communication port is formed at a bottom of the water guide portion, and the water guide portion is used to abut against the sealing member.

15. The liquid storage tank according to claim 14, wherein a flange is located on the rotary member.

16. The liquid storage tank according to claim 14, wherein the rotary member is formed in a U shape or a cambered shape, and two ends of the rotary member are rotatably connected to the tank body by means of rotary shafts respectively; and the rotary member comprises an inner side wall and an outer side wall, wherein the inner side wall is a surface facing the liquid storage tank, and the outer side wall is a surface facing away from the inner side wall.

17. The liquid storage tank according to claim 16, wherein the first snap-fit portion comprises a second protrusion, the second protrusion is located on the outer side wall of the rotary member, and the second protrusion protrudes out of a surface of the outer side wall.

18. The liquid storage tank according to claim 14, wherein the first limiting portion comprises two first protrusions, and the two first protrusions are arranged at the ends of the rotary member respectively and protrude out of end surfaces of the rotary member.

19. The liquid storage tank according to claim 14, wherein the water guide portion is a columnar boss extending in a normal direction of a bottom plane of the liquid storage tank.

* * * * *